United States Patent [19]

Emme et al.

[11] Patent Number: 5,046,570
[45] Date of Patent: Sep. 10, 1991

[54] WEIGHING DEVICE FOR CHECKOUT COUNTERS AND THE LIKE

[75] Inventors: Nils-Erik Emme, Jonkoping; Rune Olsson, Anderstorp, both of Sweden

[73] Assignee: Abo Metall AB, Jonkoping, Sweden

[21] Appl. No.: 479,298

[22] Filed: Feb. 13, 1990

[30] Foreign Application Priority Data

Feb. 13, 1989 [SE] Sweden ................................ 8900474-1

[51] Int. Cl.[5] ...................... G01G 19/00; G01G 19/40
[52] U.S. Cl. .................................. 177/145; 177/25.15
[58] Field of Search ....................... 177/16, 145, 25.15

[56] References Cited

U.S. PATENT DOCUMENTS

| | | | |
|---|---|---|---|
| 3,180,475 | 4/1965 | Del Rosso | 177/145 |
| 4,023,668 | 5/1977 | DeSanto | 177/145 X |
| 4,049,068 | 9/1977 | Kavanagh et al. | 177/145 X |
| 4,440,249 | 4/1984 | Del Rosso | 177/145 |
| 4,564,077 | 1/1986 | Del Rosso | 177/145 |

Primary Examiner—George H. Miller, Jr.

[57] ABSTRACT

An article transporting and weighing device for use at checkout counters and the like includes a series of successively-disposed conveyors operable for transporting articles thereon and therealong to a collection station, and a weighing device located under a central one of the conveyors. When an article to be weighed is being transported along the conveyors, movement of the central (i.e. scale) conveyor is halted with the article positioned thereon, whereupon the weight of the article is determined by the weighing device, and the scale conveyor is then restarted to continue transport of the article to the collection station.

25 Claims, 1 Drawing Sheet

WEIGHING DEVICE FOR CHECKOUT COUNTERS AND THE LIKE

FIELD OF THE INVENTION

The present invention relates to a device for the transport and weighing of goods. The device is primarily intended for use at or in association with checkout counters or stations or desks in shops and stores but may also be employed, by way of example, in the packaging and price labeling of goods and/or the handling of goods in warehouses and the like.

BACKGROUND OF THE INVENTION

Checkout counters in stores and supermarkets, such as so-called fast checkouts, typically include one or more conveyors operable for transporting the goods or articles being purchased past an operator or data entry clerk. A cash register for registration and entry of price and other information is also generally provided. A scale is normally present for the weighing of goods requiring such action and, in modern supermarkets and the like, a scanner for the automated reading of bar codes is often provided. The scale may, for example, be connected to or with the cash register so that information concerning the weight of the goods is automatically transferred to the register for price calculation and/or entry.

The scale device at checkout counters has heretofore typically been positioned either alongside the operator or opposite the operator on the far or remote side of the conveyor. To weigh the goods, therefore, they must be lifted or pushed or otherwise manually displaced or carried from the conveyor onto the table of the scale.

The scale table occupies space and can accordingly be unduly confining and may interfere with and hamper both the customer and the operator in their movements and/or tasks. In addition, the operator movements that are required for carrying out the weighing of articles may cause health problems for the operator as these movements often place unusual or undue stresses and strains on muscles and other physiological body parts, particularly on the back of the neck and the shoulders.

SUMMARY OF THE INVENTION

It is accordingly a primary object of the present invention to eliminate and avoid the problems mentioned hereinabove in connection with prior art article-weighing apparatus. It is a further object of the invention to avoid the drawbacks and deficiencies of prior art weighing stations while realizing more rapid completion of article weighing and throughput at a checkout counter or the like.

A device for the conveying and weighing of goods at checkout counters and the like, in accordance with the invention, includes a scale that is integrated with the goods or article-transporting conveyors. The inventive device is constructed and disposed so that the weighing of articles takes place while the goods are disposed on the conveyor. In this manner, the manual transfer of goods from conveyor to scale table is eliminated and appreciable space is freed up about or alongside the conveyor and/or register.

A device according to the invention is provided with a series of several consecutively or successively-positioned, substantially horizontal conveyors arranged one after another along the direction of article movement for transporting goods thereon and therealong. One of these conveyors—the scale conveyor—transports or carries the goods over or atop a scale table against which the scale conveyor rests. When the weighing of an article being transported thereon is required, movement of the scale conveyor is halted, the weight of the article is registered and, then, the conveyor is restarted to continue the briefly-interrupted transport of the article.

In a preferred form of the invention, the weighing device comprises three series-arranged conveyors, the first of which transports the goods toward and to the scale conveyor, the second being the scale conveyor, and the third being operable to further transport the goods from the scale conveyor to a location for article collection or bagging or other activity. A scanner for the automated reading of bar codes may be appropriately positioned at the start or entry end of the scale conveyor—i.e. at or proximate that end of the scale conveyor that is fed by and which initially receives the articles from the first conveyor. The scale device comprises a scale table which is mounted to a stand through or by way of a weight sensing and/or signalling device. The conveyor of the scale device is partially wound or wrapped and extends about spaced apart rollers that may also be carried by or mounted to the scale table. One of these rollers is provided or connected to a driving arrangement operable for effecting article-transporting movement of the conveyor. The units at a checkout counter are preferably so interconnected and associated that the scanner automatically stops article-transporting movement of the second or central conveyor of the weighing device if the price of the goods cannot be read from a bar code thereon by, for example, an automated scanner. The goods are thereafter weighed and information relating to the weight of the goods is transmitted or transferred to and registered in the cash register whereupon the weighing conveyor is restarted to carry the goods toward and/or onto the third or following conveyor.

Taring and adjustment of the scale must be carried out so that the inaccuracy of the weighing operation is suitably minimized. For weights below approximately 10 kg the inaccuracy or error tolerance should be held to no greater than $\pm 5$ g. In order to attain and assure such accuracy, taring and adjustment of the scale is repeatedly carried out on certain preselected or predetermined occasions—such, for example, as after each single weighing of an article or when the purchases of a customer are totalled or summarized at the cash register. Taring and adjustment are preferably carried out automatically on certain occasions but may also be initiated by and at the instance of the operator.

The article-weighing movements of the table of the scale are relatively small and the maximum deviation from the starting point may, for example, be on the order of 5 mm. In addition to the weight of the goods being weighed, the position and movement of the scale table is also affected by other forces, including the conveyor and the roller or conveyor driving device. It is essential for correct weighing of articles that these forces do not change from one article-weighing operation to another. The design of the roller or conveyor driving device is, in this regard, of particular importance. One currently-contemplated way of effecting the driving or movement of the weighing conveyor is through the operation of an electric motor—which may be mounted to the table of the scale and which, by a suitable gear and, for example, a belt is continuously connected to the driving roller of the conveyor. To halt transporting movement of the weighing conveyor and carry out the weighing of an article in such an arrangement, operation of the motor may be stopped, as by switching off the supply of electrical current thereto. The only thing which may then change the force by which the conveyor-driving arrangement affects the scale table is the connection between the motor and an external energy source; this connection is preferably by an electric cable.

In an alternative arrangement, article-transporting driving of the conveyor can be carried out by mounting the motor to the stand which carries the weighing device and connecting the motor drive shaft to the conveyor driving roller through a clutch. To halt movement of the conveyor and weigh an article, then, the clutch is operated to release the connection between the motor shaft and the driving roller, thereby also preventing the conveyor driving arrangement from exerting any undue forces on the scale table.

Other objects and features of the present invention will become apparent from the following detailed description, considered in conjunction with the accompanying drawing, of a currently preferred but nonetheless illustrated embodiment of the invention. It is to be understood, however, that the drawings are designed solely for purposes of illustration and not as a definition of the limits of the invention, for which reference should be made to the appended claims.

BRIEF DESCRIPTION OF THE DRAWINGS

The single FIGURE of the drawings diagrammatically depicts, in cross-sectional side view, an article transporting and weighing device constructed in accordance with the present invention.

DETAILED DESCRIPTION OF THE PREFERRED EMBODIMENT

Figure 1:
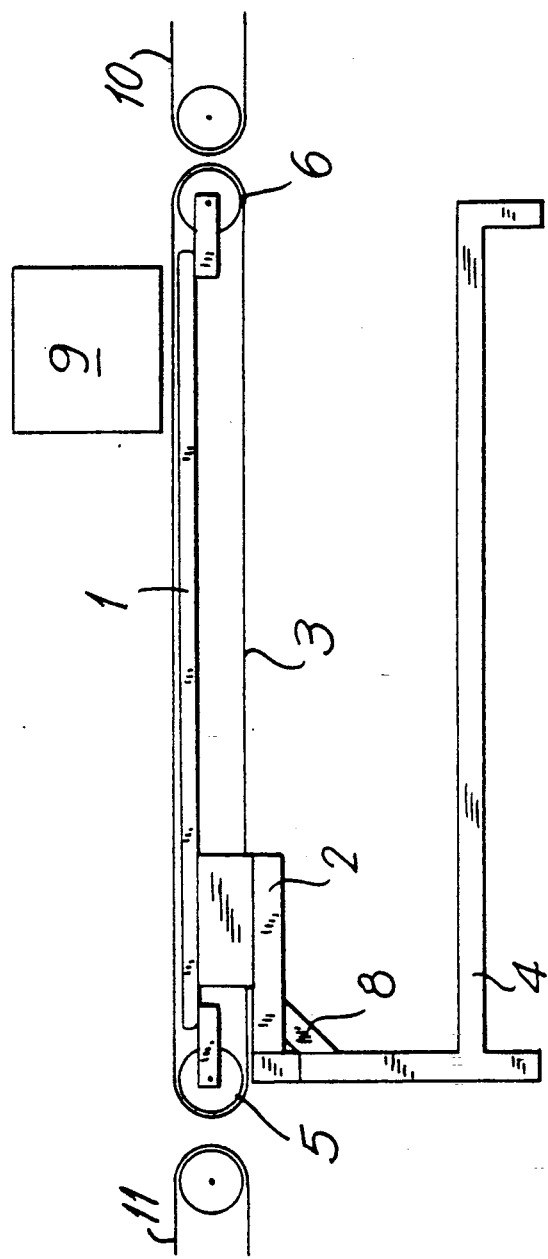

Diagrammatically depicted in the drawing FIGURE is the relevant portion of a checkout counter or station including three series-arranged conveyors or conveyor belts or bands for transporting articles along the station. More particularly, a first or entry conveyor 10 is intended for the transport of goods to the article-weighing device which includes a second or weighing or scale conveyor 3 and from which the goods are conveyed by a third or exit conveyor 11 to a location (not shown) for collection or bagging or other article-related activities. The weighing device further comprises a table 1 mounted onto and at least partly carried by a weight-sensing or signaling device 2. The signaling device may, for example, be implemented by a strain gauge and is intended, in accordance with the invention, to provide or output an electrical signal which corresponds or is related to the weight of an article or item of goods that is resting on the conveyor 3. The signaling device 2 is, in turn, mounted to a frame or stand 4 by way of a holder 8.

The table of the scale is also arranged for dependingly carrying or supporting a pair of rollers 5, 6 which carry and operatively drive the conveyor band 3 that is partially wrapped about or encircles the rollers. The driving device appropriately drives or rotates or operates the roller 5 which, in the embodiment illustrated in the drawing, is located at that end of weighing conveyor 3 which is supported for movement by the signalling device 2. As hereinabove described, driving of the roller 5 may be carried out, by way of preferred example, either by a motor mounted to the scale table 1 or through a selectively releasable clutch. Each of these arrangements are of well known kinds and, inasmuch as their exact constructions are deemed to be a matter of design choice, they are not expressly shown in the drawing FIGURE.

The conveyor driving arrangement can be controlled by or in response to signals from a bar code scanner 9 which may be positioned at the beginning, with respect to the direction of article transport, of the weighing conveyor 3. (As should be apparent, the goods being transported along the conveyors in the drawing FIGURE move from right to left.) When an article or item of goods passes the scanner 9, the scanner attempts to read a bar code on the article. If the price of the article cannot be read in this manner, movement of the conveyor 3 is halted, whereupon weighing of the article takes place and the conveyor is then restarted. The operation of the weighing conveyor 3 can accordingly be fully automatically controlled so that conveyor movement is stopped—and, when the article's weight has been registered, restarted—by the scanner or, for example, by a controller responsive to signals received from the scanner. It is also contemplated that the inventive system also enable the operator to selectively stop and start the weighing conveyor's movement as he may wish or require. It is further contemplated that movement of the entry and exit conveyors 10, 11 may be halted, either automatically or at the option of the operator, concurrently with the weighing conveyor 3.

It is anticipated and within the intended scope of the present invention that a weighing device in accordance with the invention may be employed or incorporated or integrated as a part of checkout stations or desks or counters or the like in a wide variety of ways. Moreover, the signal(s) generated in response to an article-weighing operation and which corresponds or relates to the weight of the article may be employed or processed or treated in numerous ways; for example, the weight information so generated and transmitted to the cash register may be correlated at or by the register with pricing information for the particular type of goods.

While there have been shown and described and pointed out fundamental novel features of the invention as applied to preferred embodiments thereof, it will be understood that various omissions and substitutions and changes in the form and details of the device illustrated, and in its operation, may be made by those skilled in the art without departing from the spirit of the invention. It is the intention, therefore, to be limited only as indicated by the scope of the claims appended hereto.

What is claimed is:

1. A device for transporting and weighing articles at a checkout counter, comprising:
    a plurality of successively-arranged conveyors movable for transporting articles on and along and from one to another of said conveyors; one of said conveyors comprising a scale conveyor for conveying an article to be weighed between preceding and succeeding ones of said conveyors, and having a surface on which said article is continuously supported between said preceding and succeeding conveyors;
    means operable for moving said scale conveyor so as to transport an article on and along the scale conveyor; said operable means including means for selectively halting the movement of said scale conveyor while determining the weight of an article on said scale conveyor; and means for weighing an article, said weighing means comprising a scale table disposed immediately under and in substantial abutment with said scale conveyor for determining the weight of an article on said scale conveyor.

2. A device in accordance with claim 1, wherein said operable means for moving said scale conveyor is mounted to said scale table.

3. A device in accordance with claim 2, wherein said operable means comprises a drive motor having an operatively rotatable shaft, said shaft being continuously mechanically connected for effecting movement of said scale conveyor.

4. A device in accordance with claim 2, wherein said operable means comprises a drive motor having an operatively rotatable shaft and a mechanical clutch releasably connecting said motor shaft and said scale conveyor for effecting and halting movement of said scale conveyor.

5. A device in accordance with claim 2, wherein said article weighing means further comprises a signaling unit carrying said scale table and operable in response to movement of the scale table to generate an electrical signal related to the weight of an article disposed on said scale conveyor.

6. A device in accordance with claim 5, further comprising a cash register for receiving said electrical signal from said signaling unit.

7. A device in accordance with claim 2, further comprising a scanner for reading article bar codes, said scanner being connected to said weighing means so that, when the scanner is unable to read a bar code on an article being transported on said conveyors, said operable means halts the movement of said scale conveyor whereupon weighing of the article on said scale conveyor is effected.

8. A device in accordance with claim 2, further comprising a cash register for receiving information relating to the article weight determined by said weighing means.

9. A device in accordance with claim 1, wherein said operable means comprises a drive motor having an operatively rotatable shaft, said shaft being continuously mechanically connected for effecting movement of said scale conveyor.

10. A device in accordance with claim 1, wherein said article weighing means further comprises a signaling unit carrying said scale table and operable in response to movement of the scale table to generate an electrical signal related to the weight of an article disposed on said scale conveyor.

11. A device in accordance with claim 10, further comprising a cash register for receiving said electrical signal from said signaling unit.

12. A device in accordance with claim 1, further comprising a scanner for reading article bar codes, said scanner being connected to said weighing means so that, when the scanner is unable to read a bar code on an article being transported on said conveyors, said operable means halts the movement of said scale conveyor whereupon weighing of the article on the scale conveyor is effected.

13. A device in accordance with claim 12, further comprising a cash register for receiving information relating to the article weight determined by said weighing means.

14. A device in accordance with claim 1, further comprising a cash register for receiving information relating to the article weight determined by said weighing means.

15. A device in accordance with claim 1, wherein said successively-arranged conveyors are separate from each other.

16. A device for transporting and weighing articles at a checkout counter, comprising:

a plurality of successively-arranged conveyors movable for transporting articles on and along and from one to another of said conveyors, one of said conveyors comprising a scale conveyor;

means operable for moving said scale conveyor so as to transport an article on and along the scale conveyor; said operable means being mounted to a scale table; said operable means including means for selectively halting the movement of said scale conveyor while determining the weight of an article on said weighing conveyor; and means for weighing an article, said weighing means comprising said scale table disposed immediately under and in substantial abutment with said scale conveyor for determining the weight of an article on said scale conveyor.

17. A device in accordance with claim 16, wherein said operable means comprises a drive motor having an operatively rotatable shaft, said shaft being continuously mechanically connected for effecting movement of said scale conveyor.

18. A device in accordance with claim 16, wherein said successively-arranged conveyors are separate from each other.

19. A device for transporting and weighing articles at a checkout counter, comprising:

a plurality of successively-arranged conveyors movable for transporting articles on and along and from one to another of said conveyors, one of said conveyors comprising a scale conveyor;

means operable for moving said scale conveyor so as to transport an article on and along the scale conveyor; said operable means including means for selectively halting the movement of said scale conveyor while determining the weight of an article on said scale conveyor;

means for weighing an article, said weighing means comprising a scale table disposed immediately under and in substantial abutment with said scale conveyor for determining the weight of an article on said scale conveyor; and a scanner for reading article bar codes, said scanner being connected to said weighing means so that, when the scanner is unable to read a bar code on an article being transported on said conveyors, said operable means halts the movement of said scale conveyor whereupon weighing of the article on the scale conveyor is effected.

20. A device in accordance with claim 19, further comprising a cash register for receiving information relating to the article weight determined by said weighing means.

21. A device in accordance with claim 19, wherein said successively-arranged conveyors are separate from each other.

22. A device for transporting and weighing articles at a checkout counter, comprising:

a plurality of successively-arranged conveyors movable for transporting articles on and along and from one to another of said conveyors, one of said conveyors comprising a scale conveyor;

means operable for moving said scale conveyor so as to transport an article on and along the scale conveyor; said operable means being mounted to a scale table;

means for weighing an article, said weighing means comprising said scale table disposed immediately under and in substantial abutment with said scale conveyor for determining the weight of an article on said scale conveyor; and a scanner for reading article bar codes, said scanner being connected to said weighing means so that, when the scanner is unable to read a bar code on an article being transported on said conveyors, said operable means halts the movement of said scale conveyor whereupon weighing of the article on the scale conveyor is effected.

23. A device in accordance with claim 22, wherein said successively-arranged conveyors are separate from each other.

24. A device for transporting and weighing articles at a checkout counter, comprising:

a plurality of successively-arranged conveyors movable for transporting articles on and along and from one to another of said conveyors, one of said conveyors comprising a scale conveyor;

means operable for moving said scale conveyor so as to transport an article on and along the scale conveyor; said operable means including means for selectively halting the movement of said scale conveyor while determining the weight of an article on said scale conveyor; and means for weighing an article, said weighing means comprising a scale table disposed immediately under and in substantial abutment with said scale conveyor for determining the weight of an article on said weighing conveyor; said article weighing means further comprising a signaling unit carrying said scale table and operable in response to movement of the scale table to generate an electrical signal related to the weight of an article disposed on said scale conveyor; and a scanner for reading article bar codes, said scanner being connected to said weighing means so that, when the scanner is unable to read a bar code on an article being transported on said conveyors, said operable means halts the movement of said scale conveyor whereupon weighing of the article on the scale conveyor is effected.

25. A device in accordance with claim 24, wherein said successively-arranged conveyors are separate from each other.

* * * * *